United States Patent
Kumamoto et al.

(10) Patent No.: US 6,333,388 B1
(45) Date of Patent: Dec. 25, 2001

(54) ALUMINUM COMPOUND-CONTAINING SOLID CATALYST COMPONENT, CATALYST FOR OLEFIN POLYMERIZATION AND METHOD FOR PRODUCING OLEFIN POLYMER

(75) Inventors: Shin-ichi Kumamoto; Hiroaki Katayama; Akio Imai, all of Ichihara (JP)

(73) Assignee: Sumitomo Chemical Company, Limited, Osaka (JP)

(*) Notice: Subject to any disclaimer, the term of this patent is extended or adjusted under 35 U.S.C. 154(b) by 0 days.

(21) Appl. No.: 09/516,028

(22) Filed: Feb. 29, 2000

Related U.S. Application Data

(62) Division of application No. 08/820,046, filed on Mar. 19, 1997, now Pat. No. 6,100,213.

(30) Foreign Application Priority Data

Mar. 19, 1996 (JP) .................................................. 8-062610

(51) Int. Cl.$^7$ ........................................................ C08F 4/52
(52) U.S. Cl. .................... 526/153; 526/124.3; 526/129; 526/160; 526/943; 526/124.5; 502/120; 502/128; 502/152; 502/232; 502/172
(58) Field of Search ................................ 526/124.3, 129, 526/153, 160, 943, 124.5; 502/120, 128, 152, 232, 172

(56) References Cited

U.S. PATENT DOCUMENTS

| | | |
|---|---|---|
| 4,303,771 | 12/1981 | Wagner et al. . |
| 4,359,562 | 11/1982 | Stein et al. . |
| 4,367,161 * | 1/1983 | Swift et al. ...................... 252/429 B |
| 4,897,455 * | 1/1990 | Welborn ............................... 526/129 |
| 5,910,463 * | 6/1999 | Ernst et al. .......................... 502/107 |

FOREIGN PATENT DOCUMENTS

| | | |
|---|---|---|
| 0 285 443 * | 10/1988 | (EP) . |
| A10285443 | 10/1988 | (EP) . |
| 0 313 386 * | 4/1989 | (EP) . |
| A20313386 | 4/1989 | (EP) . |
| 0 545 152 * | 6/1993 | (EP) . |
| A10545152 | 6/1993 | (EP) . |
| 0 685 494 * | 12/1995 | (EP) . |
| A10685494 | 12/1995 | (EP) . |
| 06329714 A | 11/1994 | (JP) . |
| 9410180 | 5/1994 | (WO) . |

* cited by examiner

Primary Examiner—David W. Wu
Assistant Examiner—Ling-Siu Choi
(74) Attorney, Agent, or Firm—Birch, Stewart, Kolasch & Birch, LLP

(57) ABSTRACT

Described are an aluminum compound-containing solid catalyst component obtained by bringing a carrier into contact with an organoaluminumoxy compound, followed by bringing this product into contact with a compound having an electron attractive group; a transition metal-containing solid catalyst component obtained by bringing the aluminum compound-containing solid catalyst component into contact with a transition metal compound; a catalyst for olefin polymerization, constituting the aluminum compound-containing solid catalyst component and an organoaluminum compound; and a method for producing an olefin polymer, which includes polymerizing or copolymerizing an olefin using the catalyst for olefin polymerization.

18 Claims, No Drawings

ALUMINUM COMPOUND-CONTAINING SOLID CATALYST COMPONENT, CATALYST FOR OLEFIN POLYMERIZATION AND METHOD FOR PRODUCING OLEFIN POLYMER

This application is a divisional of application Ser. No. 08/820,046, filed on Mar. 19, 1997, now U.S. Pat. No. 6,100,213, contents of which are hereby incorporated by reference.

BACKGROUND OF THE INVENTION

1. Field of the Invention

The present invention relates to an olefin polymerization solid catalyst component supported with a carrier, and a method for producing an olefin polymer using the same. More particularly, the present invention relates to an olefin polymerization catalyst which can be employed in slurry polymerization and gas-phase polymerization to produce an olefin polymer having excellent particle properties with high polymerization activity in that case, and a method for producing an olefin polymer using the same.

2. Prior Arts

A number of methods for producing an olefin polymer using a transition metal compound have already been reported. In the case of a metallocene transition metal compound, JP-58019309-A discloses a method for producing an olefin polymer using a metallocene complex and an aluminoxane. JP-01502036-A discloses a method for producing an olefin polymer using a metallocene complex and a boron compound. WO94/10180 and JP-06329714-A disclose an olefin polymerization catalyst comprising a metallocene complex and a modified aluminumoxy compound and exhibiting a high polymerization activity. However, olefin polymers obtained from the soluble metallocene catalysts proposed have an irregular form and low bulk density. When the metallocene catalyst is employed in slurry polymerization or gas-phase polymerization, problems arise such as poor heat transfer and a decrease in productivity due to formation of an agglomerate polymer and adhesion of a polymer formed on the wall of the polymerization vessel.

In order to solve these problems, methods for supporting a part or all of the catalyst components on an inorganic oxide carrier are proposed in, for example, JP-61108610-A, JP-61276805-A and JP-61296008-A. Further, supporting of catalyst components on an organic carrier such as polystyrene carrier having a polar functional group or the like is proposed in U.S. Pat. No. 5,362,824 and JP-07053623-A. By these methods, olefin polymers excellent in particle properties can be obtained. However, the catalytic activity is still insufficient in these methods and, therefore, a supported catalyst system having high activity has been required.

The present inventors have intensively studied so as to solve the above problems. As a result, the present invention has been accomplished.

SUMMARY OF THE INVENTION

An object of the present invention is to provide an olefin polymerization catalyst which produces an olefin polymer excellent in particle property and exhibits high polymerization activity in slurry polymerization or gas-phase phase polymerization process, and a method for producing an olefin polymer with the catalyst.

The present invention provides an aluminum compound-containing solid catalyst component obtained by contacting a carrier with an organoaluminumoxy compound, followed by contacting with a compound having an electron attractive group.

Further, the present invention also provides a transition metal-containing solid catalyst component obtained by contacting the aluminum compound-containing solid catalyst component with a transition metal compound; a catalyst for olefin polymerization comprising the aluminum compound-containing solid catalyst component and an organoaluminum compound; and a method for producing an olefin polymer, which comprises polymerizing or copolymerizing an olefin using the catalyst for olefin polymerization.

The present invention will be explained in detail.

DETAILED DESCRIPTION OF THE INVENTION (A) Carrier

The carrier (A) used in the present invention includes an inorganic carrier and an organic carrier. A plurality of carriers can be used as a mixture, and the carrier may contain a small amount of water as absorbed water or in hydrate form. The carrier is preferably a porous one. The micro pore volume of the porous carrier is preferably not less than 0.1 ml/g, more preferably not less than 0.3 ml/g. The average particle diameter of the carrier is preferably from 5 to 1,000 $\mu$m, more preferably from 10 to 500 $\mu$m.

Examples of the inorganic carrier include inorganic oxides, magnesium compounds, clay minerals and the like. Examples of the inorganic oxide include $SiO_2$, $Al_2O_3$, MgO, $ZrO_2$, $TiO_2$, $B_2O_3$, CaO, ZnO, BaO, $ThO_2$ and double oxide thereof, e.g. $SiO_2$—$Al_2O_3$, $SiO_2$—MgO, $SiO_2$—$TiO_2$, $SiO_2$—$TiO_2$—MgO. Examples of the magnesium compound include $MgCl_2$, MgCl(OEt) and the like. Examples of the clay mineral include kaolin, bentonite, kibushi clay, geyloam clay, allophane, hisingerite, pyrophylite, talc, micas, montmorillonites, vermiculite, chlorites, palygorskite, kaolinite, nacrite, dickite, halloysite and the like.

Examples of the organic carrier include an acrylic polymer, a styrene polymer, an ethylene polymer, a propylene polymer and the like. Among these, an acrylic polymer and a styrene polymer are preferred.

Examples of the acrylic polymer include polymers of acrylic monomers such as acrylonitrile, methyl acrylate, methyl methacrylate, methacrylonitrile and the like, and copolymers of the monomers and crosslinking polymerizable compounds having at least two unsaturated bonds.

Examples of the styrene polymer include polymers of styrene monomers such as styrene, vinyltoluene, ethylvinylbenzene and the like, and copolymers of the monomers and crosslinking polymerizable compounds having at least two unsaturated bonds.

Specific examples of the crosslinking polymerizable compound having at least two unsaturated bonds include divinylbenzene, trivinylbenzene, divinyltoluene, divinylketone, diallyl phthalate, diallyl maleate, N,N'-methylenebisacrylamide, ethylene glycol dimethacrylate, polyethylene glycol dimethacrylate and the like.

It is preferred that the organic carrier has a polar functional group. As the polar functional group, primary amino group, secondary amino group, imino group, amide group, imide group, hydrazide group, amidino group, hydroxy group, hydroperoxy-group, carboxyl group, formyl group, methyloxycarbonyl group, carbamoyl group, sulfo group, sulfino group, sulfeno group, thiol group, thiocarboxyl group, thioformyl group, pyrrolyl group, imidazolyl group, piperidyl group, indazolyl group and carbazolyl group are preferred. More preferred are primary amino group, secondary amino group, imino group, amide group, imide group, hydroxy group, formyl group, carboxyl group, sulfo group and thiol group. Particularly preferred are primary amino group and secondary amino group.

Regarding a method for preparing the organic carrier having a polar functional group, when the organic carrier originally has a polar functional group, the organic carrier can be used as it is. One or more kinds of polar functional groups can also be introduced by subjecting the organic carrier as a matrix to a suitable chemical treatment. The chemical treatment may be any method capable of introducing the polar functional group into the organic carrier. For example, it may be a reaction between an acrylic polymer and a polyalkylenepolyamine such as ethylenediamine, propanediamine, diethylenetriamine, tetraethylenepentamine, dipropylenetriamine or the like.

As the specific method of such a reaction, for example, there is a method of treating an acrylic polymer (e.g. polyacrylonitrile) in a slurry state in a mixed solution of ethylenediamine and water at 100° C. or more, preferably from 120° to 150° C.

The amount of polar functional group per unit gram in the organic carrier having a polar functional group is preferably from 0.01 to 50 mmol/g, more preferably from 0.1 to 20 mmol/g.

(B) Organoaluminumoxy Compound

As the organoaluminumoxy compound (B) used in the present invention, a known organoaluminumoxy compound can be used. Preferred examples include a cyclic aluminoxane having a structure represented by the general formula $\{-Al(R^1)-O-\}_a$ and/or a linear aluminoxane having a structure represented by the general formula $R^1(-Al(R^1)-O-)_b AlR^1_2$ ($R^1$ represents a hydrocarbon group having 1 to 8 carbon atoms, and all $R^1$ may be the same or different; and each of "a" and "b" represents an integer of not less than 1).

Specific examples of $R^1$ in the cyclic aluminoxane having a structure represented by the general formula $\{-Al(R^1)-O-\}_a$ and the linear aluminoxane having a structure represented by the general formula $R^1(-Al(R^1)-O-)_b AlR^1_2$ include alkyl groups having 1–10 carbon atoms such as methyl, ethyl, n-propyl, isopropyl, n-butyl, isobutyl, n-pentyl, neopentyl and the like. It is preferably methyl or isobutyl, more preferably methyl. Each of "a" and "b" preferably represent an integer of 1 to 40, more preferably 3 to 20.

The aluminoxane can be prepared by various methods, for example, a known method. For example, it can be prepared by contacting a solution prepared by dissolving at least one trialkylaluminum (e.g. trimethylaluminum, etc.) in a suitable organic solvent (e.g. benzene, an aliphatic hydrocarbon, etc.) with water. According to another method, it can be prepared by contacting at least one trialkylaluminum (e.g. trimethylaluminum, etc.) with a metal salt hydrate (e.g. copper sulfate hydrate, etc.).

The organoaluminumoxy compound used in the present invention may contain a small amount of a trialkylaluminum which is produced on preparation.

(C) Compound Having Electron Attractive Group

The compound (C) having an electron attractive group used in the present invention includes any compounds having an electron attractive group, and is preferably an aromatic or aliphatic compound having an electron attractive group. A compound having a polar functional group, together with the electron attractive group, is preferred. The electron attractive group is a substituent having a Hammett substituent constant a which is positive, and examples thereof include fluoro group, chloro group, bromo group, iodo group, cyano group, nitro group, carbonyl group, sulfo group, phenyl group and the like. The polar functional group includes a functional group capable of forming a chemical bond to an organoaluminum compound, and examples thereof include hydroxy group, primary amino group, secondary amino group, imino group, amide group, imide group, formyl group, carboxy group, sulfo group, thiol group and the like. The compound having an electron attractive group used in the present invention may have various or a plurality of electron attractive groups or polar functional groups.

Specific examples of the compound having an electron attractive group include compounds having a polar functional group, together with the electron attractive group, such as pentafluorophenol, 2,3,5,6-tetrafluorophenol, 2,4,6-trifluorophenol, 2,3-difluorophenol, 2,4-difluorophenol, 2,5-difluorophenol, 2,6-difluorophenol, 3,4-difluorophenol, 3,5-difluorophenol, 2-fluorophenol, 3-fluorophenol, 4-fluorophenol, 2-trifluoromethylphenol, 3-trifluoromethylphenol, 4-trifluoromethylphenol, pentafluorobenzamide, pentafluoroaniline, pentafluorobenzoic acid, pentafluorobenzyl alcohol, pentafluorothiophenol, 2,2,2-trifluoroethyl alcohol, 1H,1H-pentafluoro-propanol, 1,1,1,3,3,3-hexafluoro-2-propyl alcohol, trifluoroacetic acid, trifluoromethanesulfonic acid, pentachlorophenol, pentabromophenol, 2-chloro-4-fluorophenol, 2-bromo-4-fluorophenol, 2-bromo-4,5-difluorophenol, tetrafluorocatechol, tetrafluorohydroquinone and the like. Among them, halogenated phenols are preferred, more preferably fluorinated phenols. Particularly preferred is pentafluorophenol.

(D) Transition Metal Compound

As the transition metal compound (D) used in the present invention, any transition metal compound having olefin polymerization activity can be used. A metallocene transition metal compound is preferred.

The metallocene transition metal compound is normally represented by the general formula $ML_a X_{n-a}$ (wherein M represents a transition metal atom of the 4th Group or Lanthanide Series of the Periodic Table of Elements (1993, IUPAC); L represents a group having a cyclopentadienyl skeleton or a group having a hetero atom, at least one of which being the group having a cyclopentadienyl skeleton, and a plurality of L may be the same or different and may be crosslinked to each other; X represents a halogen atom or a hydrocarbon group having 1 to 20 carbon atoms; "a" represents a numeral satisfying the expression $0 < a \leq n$; and n represents a valence of a transition metal atom M).

In the above formula, M is a transition metal atom of the 4th Group or Lanthanide Series of the Periodic Table of Elements (1993, IUPAC), and examples thereof include transition metals of the 4th Group of the Periodic Table, such as titanium atom, zirconium atom and hafnium atom and transition metals of the Lanthanide Series, such as samarium. Preferred are titanium atom, zirconium atom and hafnium atom.

L in the above formula of the metallocene transition metal compound is a group having a cyclopentadienyl skeleton or a group having a hetero atom, and at least one of L has a cyclopentadienyl skeleton. A plurality of L may be the same or different and may be crosslinked each other. The group having a cyclopentadienyl skeleton is, for example, cyclopentadienyl group, a substituted cyclopentadienyl group or polycyclic group having a cyclopentadienyl skeleton. Examples of the substituent of the substituted cyclopentadienyl group include a hydrocarbon group having 1 to 20 carbon atom, a halogenated hydrocarbon group having 1 to 20 carbon atoms, a silyl group having 1 to 20 carbon atoms and the like. Examples of the polycyclic group having a cyclopentadienyl skeleton include an indenyl group, a fluorenyl group and the like. Examples of the hetero atom of the group having a hetero atom include nitrogen atom, oxygen atom, phosphorous atom, sulfur atom and the like.

Specific examples of the substituted cyclopentadienyl group include methylcyclopentadienyl group, ethylcyclopentadienyl group, n-propylcyclopentadienyl group, n-butylcyclopentadienyl group, isopropylcyclopentadienyl group, isobutylcyclopentadienyl group, sec-butylcyclopentadienyl group, tert-butylcyclopentadienyl group, 1,2-dimethylcyclopentadienyl group, 1,3-dimethylcyclopentadienyl group, 1,2,3-trimethylcyclopentadienyl group, 1,2,4-trimethylcyclopentadienyl group, tetramethylcyclopentadienyl group, pentamethylcyclopentadienyl group and the like.

Specific examples of the polycyclic group having a cyclopentadienyl group include indenyl group, 4,5,6,7-tetrahydroindenyl group, fluorenyl group and the like.

Examples of the group having a hetero atom include methylamino group, tert-butylamino group, benzylamino group, methoxy group, tert-butoxy group, phenoxy group, pyrrolyl group, thiomethoxy group and the like.

The groups having a cyclopentadienyl skeleton or the group having a cyclopentadienyl skeleton and the group having a hetero atom may be crosslinked each other with an alkylene group such as ethylene, propylene and the like; substituted alkylene group such as isopropylidene, diphenylmethylene and the like; silylene group; or substituted silylene group such as dimethylsilylene group, diphenylsilylene group, methylsilylsilylene group and the like.

X in the above formula of the metallocene transition metal compound is a halogen atom or a hydrocarbon group having 1 to 20 carbon atoms. Specific examples of X include a halogen atom such as fluorine atom, chlorine atom, bromine atom, iodine atom and the like; and an alkyl group having 1 to 20 carbon atoms such as methyl group, ethyl group, n-propyl group, isopropyl group, n-butyl group, benzyl group and the like.

Among the metallocene transition metal compound represented by $ML_aX_{n-a}$, specific examples of the compound wherein M is zirconium include
bis(cyclopentadienyl)zirconium dichloride,
bis(cyclopentadienyl)zirconium dibromide,
bis(cyclopentadienyl)zirconiumdimethyl,
bis(methylcyclopentadienyl)zirconium dichloride,
bis(methylcyclopentadienyl)zirconium dibromide,
bis(methylcyclopentadienyl)zirconiumdimethyl,
bis(pentamethylcyclopentadienyl)zirconium dichloride,
bis(pentamethylcyclopentadienyl)zirconium dibromide,
bis(pentamethylcyclopentadienyl)zirconiumdimethyl,
bis(indenyl)zirconium dichloride, bis(indenyl)zirconium dibromide, bis(indenyl)zirconiumdimethyl, bis(4,5,6,7-tetrahydroindenyl)zirconium dichloride, bis(4,5,6,7-tetrahydroindenyl)zirconium dibromide, bis(4,5,6,7-tetrahydroindenyl)zirconiumdimethyl,
bis(fluorenyl)zirconium dichloride,
bis(fluorenyl)zirconium dibromide,
bis(fluorenyl)zirconiumdimethyl,
ethylenebis(indenyl)zirconium dichloride,
ethylenebis(indenyl)zirconium dibromide,
ethylenebis(indenyl)zirconiumdimethyl,
ethylenebis(4,5,6,7-tetrahydroindenyl)zirconium dichloride,
isopropylidene(cyclopentadienylfluorenyl)zirconium dichloride,
dimethylsilylenebis (cyclopentadienyl)zirconium dichloride,
dimethylsilylenebis(indenyl)zirconium dichloride,
dimethylsilylenebis(4,5,6,7-tetrahydroindenyl)zirconium dichloride, dimethylsilylene(cyclopentadienylfluorenyl) zirconium dichloride,
diphenylsilylenebis(indenyl)zirconium dichloride,
cyclopentadienyldimethylaminozirconium dichloride,
cyclopentadienylphenoxyzirconium dichloride,
dimethyl(tert-butylamino)(tetramethylcyclopentadienyl) silanezirconium dichloride,
isopropylidene(cyclopentadienyl)(3-tert-butyl-5-methyl-2-phenoxy)zirconium dichloride,
dimethylsilylene(tetramethylcyclopentadienyl)(3-tertbutyl-5-methyl-2-phenoxy)zirconium dichloride and the like.

Compounds wherein zirconium is replaced with titanium or hafnium in the above zirconium compounds can also be exemplified.

(E) Organoaluminum Compound

As the organoaluminum compound (E) used in the present invention, a known organoaluminum compound can be used. Preferred is an organoaluminum compound represented by the general formula $R^2_cAlY_{3-c}$ (wherein $R^{20}$ represents a hydrocarbon group having 1 to 8 carbon atoms; Y represents hydrogen atom and/or halogen atoms; and "c" represents an integer of 0 to 3).

Specific examples of $R^{20}$ include methyl group, ethyl group, n-propyl group, n-butyl group, isobutyl group, n-hexyl group and the like. Preferred are methyl group, ethyl group and isobutyl group. Specific examples of the halogen atom for Y include fluorine atom, chlorine atom, bromine atom and iodine atom. Chlorine atom is preferred.

Specific examples of the organoaluminum compound represented by the above general formula $R^2_cAlY_{3-c}$ include trialkylaluminums such as trimethylaluminum, triethylaluminum, tri-n-propylaluminum, trisobutylaluminum, tri-n-hexylaluminum and the like: dialkylaluminums chloride such as dimethylaluminum chloride, diethylaluminum chloride, di-n-propylaluminum chloride, diisobutylaluminum chloride, di-n-hexylaluminum chloride and the like; alkylaluminum dichlorides such as methylaluminum dichloride, ethylaluminum dichloride, n-propylaluminum dichloride, isobutylaluminum dichloride, n-hexylaluminum dichloride and the like; and dialkylaluminum hydrides such as dimethylaluminum hydride, diethylaluminum hydride, di-n-propylaluminum hydride, diisobutylaluminum hydride, di-n-hexylaluminum hydride and the like. Among them, trialkylaluminums are preferred. More preferred are trimethylaluminum, triethylaluminum and triisobutylaluminum.

(F) Aluminum Compound-containing Solid Catalyst Component

The aluminum compound-containing solid catalyst component of the present invention is obtained by bringing the carrier (A) into contact with the organoaluminumoxy compound (B), followed by bringing into contact with the compound having an electron attractive group(C). In a method of firstly bringing the organoaluminumoxy compound (B) into contact with the compound having an electron attractive group (C), followed by bringing into contact with the carrier (A), the polymerization activity of the aluminum compound-containing solid catalyst obtained is not sufficient.

It is preferred that a contact operation is conducted in an inert gas atmosphere. The contact temperature is preferably from −80 to 200° C., more preferably from 0 to 120° C. The contact time is preferably from 1 minute to 36 hours, more preferably from 10 minutes to 24 hours. It is preferred that a solvent used for preparing the aluminum compound-containing solid catalyst component is an aliphatic or aromatic solvent which is inert to the carrier (A), organoaluminumoxy compound (B), compound having an electron attractive group (C), transition metal compound (D) and organoaluminum compound (E). Specific examples thereof include n-butane, hexane, heptane, benzene, toluene, dichloromethane, chloroform and the like. Examples of the treatment after the completion of the contact operation include filtration of a supernatant, followed by washing with an inert solvent and evaporation of a solvent under reduced pressure or in an inert gas flow, but these treatments may not be conducted. The resulting aluminum compound-containing solid catalyst component may be used: for polymerization in the state of fluid dry or semi-dry powder, and may be used for polymerization in the state of being suspended in-the inert solvent.

The amount of the organoaluminumoxy compound (B) in the solid component obtained by bringing the carrier (A) into contact with the organoaluminumoxy compound (B) is preferably not less than 0.1 mmol, more preferably not less than 1 mmol, in terms of an aluminum atom in 1 g of the solid component in the dry state. When the solid component obtained by bringing the carrier (A) into contact with the organoaluminumoxy compound (B) is brought into contact with the compound having an electron attractive group (C), the molar ratio of the compound having an electron attractive group (C) to the aluminum atom of the organoaluminumoxy compound in the solid component is preferably from 0.1 to 100, more preferably from 0.2 to 2, the most preferably from 0.3 to 1.

(G) Catalyst for Olefin Polymerization

The resulting aluminum compound-containing solid catalyst component can be used for polymerization as it is, as one component of the catalyst, together with the transition metal compound (D) and organoaluminumoxy compound (E). The aluminum compound-containing solid catalyst component may also be used for polymerization after previously bringing it into contact with the transition metal compound (D) or organoaluminumoxy compound (E). Preferably, it is previously brought into contact with the transition metal compound (D) to obtain a transition metal-containing solid catalyst component, which is then used for polymerization, together with the organoaluminum compound (E).

The atomic ratio of an aluminum metal of the organoaluminiumoxy compound (B) to a transition metal atom of the transition metal compound (D) is preferably 3 or more, more preferably from 5 to 1,000, particularly from 10 to 500. The atomic ratio of an aluminum atom of the organoaluminium compound (E) to the transition metal atom of the transition metal compound (D) is preferably from 0.01 to 10,000, more preferably from 0.1 to 5,000.

(H) Polymerization

In the present invention, any olefin or dioelfin having 2 to 20 carbon atoms can be used as a monomer for polymerization. Specific examples thereof include ethylene, propylene, butene-1, pentene-1, hexene-1, heptene-1, octene-1, nonene-1, decene-1, hexadecene-1, eicocene-1,4-methylpentene-1,5-methyl-2-pentene-1, vinylcyclohexane, styrene, dicyclopentadiene, norbornene, 5-ethylidene-2-norbornene and the like, but are not limited thereto. In the present invention, copolymerization can be conducted using two or more monomers, simultaneously. Specific examples of the monomers constituting the copolymer include ethylene/an α olefin such as ethylene/propylene, ethylene/butene-1, ethylene/hexene-1, ethylene/propylene/butene-1, ethylene/propylene/5-ethylidene-2-norbornene and the like, propylene/butene-1, and the like, but are not limited thereto.

The polymerization method is not specifically limited, and both liquid phase polymerization method and gas phase polymerization method can be used. Examples of the solvent used for the liquid phase polymerization include aliphatic hydrocarbons such as butane, pentane, heptane, octane and the like; aromatic hydrocarbons such as benzene, toluene and the like; and hydrocarbon halides such as methylene chloride and the like. It is also possible to use the olefin itself to be polymerized as a solvent. The polymerization can be conducted in a batch-wise, semibatch-wise or continuous manner, and polymerization may be conducted in two or more stages which differ in reaction conditions. The polymerization temperature is preferably from −50 to 200° C., more preferably from 0 to 100° C. The polymerization pressure is preferably from normal pressure to 100 kg/cm$^2$, more preferably from normal pressure to 50 kg/cm$^2$. The polymerization time-is appropriately determined according to the kind of the desired olefin polymer and reaction apparatus, and is generally within the range from 1 minute to 20 hours. In the present invention, a chain transfer agent such as hydrogen may be added to adjust the molecular weight of the olefin polymer to be obtained in polymerization.

EXAMPLE

The present invention is explained with the following Examples and Comparative Examples in detail but is not limited thereto. Properties of the olefin polymer in the Examples were measured by the following methods.

(1) A content of α-olefin was determined from characteristic absorptions of ethylene and α-olefin by a calibration curve, using an infrared spectrometer (1600 Series, manufactured by Perkin-Elmer Co.), and was represented as a short chain branch number (SCB) per 1000° C.

(2) MFR(Melt flow rate) was measured at 190° C. according to JIS K6760.

(3) An apparent bulk density (BD) was determined by dividing a weight of the resulting polymer by an apparent volume.

Example 1

(1) Preparation of Methylaluminoxane-treated Silica

After the atmosphere in a 200 ml flask equipped with a stirrer, a dropping funnel and a thermometer was replaced with nitrogen, 9.78 g of a silica (ES70X, micro porous volume; 1.57 ml/g, specific surface area; 354 m$^2$/g, manufactured by Crossfield Co.) calcined under a nitrogen flow at 300° C. for 5 hours was collected therein. Toluene (120 ml) was added to form a slurry and, after cooled to 4° C., 34.8 ml of a toluene solution of methylaluminoxane (1.97 mmol/g, manufactured by Toso-Akzo Co.) was added dropwise. As a result, gas was generated. After stirring at 4° C. for 30 minutes, then at 80° C. for 5 hours, the supernatant was removed by filtration. The residue was washed twice with 100 ml of toluene, washed once with 100 ml of hexane and then dried under reduced pressure to obtain 12.3 g of a fluid solid.

The content of aluminum in 1 g of the resulting fluid solid was 3.41 mmol.

(2) Preparation of Aluminum Compound-containing Solid Catalyst Component

After the atmosphere in a 200 ml flask equipped with a stirrer and a dropping funnel was replaced with nitrogen, 5.90 g of the methylaluminoxane-treated silica prepared in (1) above was collected therein. Toluene (80 ml) was added to form a slurry and 40 ml of a toluene solution of pentafluorophenol (3.70 g) was added dropwise. As a result, gas was generated. After stirring at 30° C. for 3 hours, the supernatant was removed by filtration. The residue was washed three times with 80 ml of toluene, washed once with 80 ml of hexane and then dried under reduced pressure to obtain 8.14 g of a fluid solid.

(3) Preparation of Transition Metal-containing Solid Catalyst Component

After the atmosphere in a 100 ml flask equipped with a stirrer was replaced with nitrogen, 1.55 g of the aluminum compound-containing solid catalyst component prepared in (2) above was collected therein. Toluene (35 ml) was added to form a slurry and 3.84 ml of a toluene solution of dicyclopentadienylzirconium dichloride (4 µmol/ml) was added, followed by stirring at room temperature for 1 hour. The supernatant was removed by filtration, and the residue was washed twice with 50 ml of toluene, washed once with 100 ml of hexane and then dried under reduced pressure to obtain a fluid solid.

Contents of zirconium and aluminum in 1 g of the resulting fluid solid were 8.77 µmol and 2.34 mmol, respectively.

(4) Polymerization

The interior of an autoclave (internal volume: 400 ml) equipped with a stirrer was evacuated, and 85 g of butane and 15 g of butene-1 were charged thereto, followed by heating to 70° C. After heating, ethylene was added so that it's partial pressure became 6 kg/cm$^2$. After the interior of the system became stable, 1 ml of a heptane solution of triisobutylaluminum (1 mmol/ml) was introduced, and then 23.7 mg of the transition metal-containing solid catalyst component prepared in (3) above was introduced. The polymerization was carried out at 70° C., while ethylene was fed to maintain the total pressure at constant. One hour after the beginning of the polymerization, the polymerization was terminated by introducing 3 ml of ethanol. As a result, 117.8 g of an olefin polymer was obtained and adhesion of the polymer onto the inner wall of the autoclave was not observed. The polymerization activity per transition metal was $8.6 \times 10^7$ (g/mol/hour).

The resulting polymer had SCB of 22.7, MFR of 0.0903 and BD of 0.35 (g/ml).

Example 2

(1) Preparation of Transition Metal-containing Solid Catalyst Component

After the atmosphere in a 200 ml flask equipped with a stirrer was replaced with nitrogen, 10.2 g of the methylaluminoxane-treated silica prepared in the same manner as, Example 1 (1) was collected therein. Toluene (100 ml) was added to form a slurry and, after cooled to 4° C., 30 ml of a toluene solution of pentafluorophenol (6.42 g) was added dropwise, followed by stirring at room temperature for 3 hours. The supernatant was removed by filtration and the residue was washed five times with 100 ml of toluene, and then 100 ml of toluene was added to form a slurry. To the slurry was added 69.7 ml of a toluene solution of dicyclopentadienylzirconium dichloride (4 µmol/ml), followed by stirring at room temperature for 1 hour. After the supernatant was removed by filtration, the residue was washed three times with 100 ml of toluene, washed once with 100 ml of hexane and then dried under reduced pressure to obtain a fluid solid.

Amounts of zirconium and aluminum in 1 g of the resulting fluid solid were 19.7 µmol and 2.24 mmol, respectively.

(2) Polymerization

After the interior of an autoclave (internal volume: 1 liter) equipped with a stirrer was heated to 80° C. and evacuated, 20 g of NaCl, butene-1 (partial pressure: 660 mmHg) and ethylene (partial pressure: 11 kg/cm$^2$) were introduced, followed by heating to 72° C. Then, 0.2 ml of a heptane solution of triisobutylaluminum (1.0 mmol/ml) and 39.0 mg of the transition metal-containing solid catalyst component prepared in (1) above were introduced. The polymerization was carried out at 80° C., while a mixed gas of ethylene and butene-1 (content of butene-1: 1.8%) was fed to maintain the total pressure at constant. Sixty minutes after the beginning of the polymerization, the polymerization was terminated by introducing 3 ml of ethanol. Amounts of the autoclave was washed with water and dried to obtain 41.4 g of an olefin polymer. The polymerization activity per transition metal was $5.5 \times 107$ (g/mol/hour).

The resulting olefin polymer had SCB of 18.3 and MFR of 0.05 or less.

Example 3

(1) Preparation of Transition Metal-containing Solid Catalyst Component

After the atmosphere in a 100 ml flask equipped with a stirrer was replaced with nitrogen, 1.43 g of the aluminum compound-containing solid catalyst component prepared in Example 1 (2) was collected therein. Toluene (35 ml) was added to form a slurry and 3.50 ml of a toluene solution of dimethylsilylene(tetramethylcyclopentadienyl)(t-butylammonium)titanium dichloride (4 µmol/ml) was added, followed by stirring at room temperature for 1 hour. After the supernatant was removed by filtration, the residue was washed twice with 50 ml of toluene, washed once with 50 ml of hexane and then dried under reduced pressure to obtain a fluid solid.

Contents of zirconium and aluminum in 1 g of the resulting fluid solid were 7.63 µmol and 2.34 mmol, respectively.

(2) Polymerization

The interior of an autoclave (internal volume: 400 ml) equipped with a stirrer was evacuated and 100 g of butane was introduced., followed by heating to 70° C. After heating, ethylene was added so that it's partial pressure became 6 kg/cm$^2$. After the interior of the system became stable, 1 ml of a heptane solution of triisobutylaluminum (1 mmol/ml) was introduced and then 49.0 mg of the transition metal-containing solid catalyst component prepared in (1) above was introduced. The polymerization was conducted at 70° C. while ethylene was fed to maintain the total pressure at constant. One hour after the beginning of the polymerization, the polymerization was terminated by introducing 3 ml of ethanol. As a result, 6.38 g of an olefin polymer was obtained. The polymerization activity per transition metal was $1.7 \times 10^7$ (g/mol/hour).

Example 4

(1) Polymerization

The interior of an autoclave (internal volume: 400 ml) equipped with a stirrer was evacuated and 100 g of butane and 3 ml of hexene-1 were charged, followed by heating to 70° C. After heating, ethylene was added so that it's partial pressure became 6 kg/cm$^2$. After the interior of the system became stable, 1 ml of a heptane solution of triisobutylaluminum (1 mmol/ml) and 1 ml of a toluene solution of dimethylsilylene(tetramethylcyclopentadienyl)(t-butylammonium)titanium dichloride (1 µmol/ml) were introduced, followed by introducing 81.3 mg of the aluminum compound-containing solid catalyst component prepared in the Example 1 (2). The polymerization was conducted at 70° C., while ethylene was fed to maintain the total pressure at constant. Twenty-five minutes after the beginning of the polymerization, the polymerization was terminated by introducing 3 ml of ethanol. As a result, 8.72 g of an olefin polymer was obtained and adhesion of the polymer onto the inner wall of the autoclave was not recognized. The polymerization activity per transition metal was $2.1 \times 10^7$ (g/mol/hour).

The resulting olefin polymer had SCB of 19.2 and FMR of less than 0.05.

Example 5

(1) Preparation of Transition Metal-containing Solid Catalyst Component

After the atmosphere in a 100 ml flask equipped with a stirrer was replaced with nitrogen, 1.96 g of the aluminum compound-containing solid catalyst component prepared in Example 1 (2) was collected therein. Toluene (40 ml) was added to form a slurry and 5.97 ml of a toluene solution of ethylenebisindenylzirconium dichloride (4 µmol/ml) was added, followed by stirring at room temperature for 1 hour. The supernatant was removed by filtration and the residue was washed twice with 50 ml of toluene, washed once with 50 ml of hexane and then dried under reduced pressure to obtain a fluid solid.

Amounts of zirconium and aluminum in 1 g of the resulting fluid solid were 7.67 µmol and 2.34 mmol, respectively.

(2) Polymerization

The interior of an autoclave (internal volume: 400 ml) equipped with a stirrer was evacuated and 95 g of butane and 5 g of butene-1 were introduced, followed by heating to 70° C. After heating, ethylene was added so that it's partial pressure became 6 kg/cm$^2$. After the interior of the system became stable, 1 ml of a heptane solution of triisobutylaluminum (1 mmol/ml) was introduced and then 20.6 mg of the transition metal-containing solid catalyst component prepared in the term (1) was introduced. The polymerization was conducted at 70° C., while ethylene was fed to maintain the total pressure at constant. One hour after the beginning of the polymerization, the polymerization was terminated by introducing 3 ml of ethanol. As a result, 10.4 g of an olefin polymer was obtained. The polymerization activity per transition metal was $6.6 \times 10^7$ (g/mol/hour).

The resulting olefin polymer had SCB of 19.7 and MFR of less than 0.05.

Example 6

(1) Preparation of Aluminum Compound-containing Solid Catalyst Component

After the atmosphere in a 100 ml flask equipped with a stirrer was replaced with nitrogen, 2.58 g of the methylaluminoxane-treated silica prepared in Example 1 (1) was collected therein. Toluene (50 ml) was added to form a slurry and 0.93 ml of 1,1,1,3,3,3-hexafluoro-2-propyl alcohol was added dropwise. As a result, gas was generated. After stirring at 30° C. for 3 hours, the supernatant was removed by filtration. The residue was washed three times with 50 ml of toluene, washed once with 50 ml of hexane and then dried under reduced pressure to obtain 3.30 g of a fluid solid.

(2) Preparation of Transition Metal-containing Solid Catalyst Component

After the atmosphere in a 100 ml flask equipped with a stirrer was replaced with nitrogen, 1.32 g of the aluminum compound-containing solid catalyst component prepared in the term (1) was collected therein. Toluene (40 ml) was added to form a slurry and 3.50 ml of a toluene solution of dicyclopentadienylzirconium dichloride (4 µmol/ml) was added, followed by stirring at room temperature for 1 hour. The supernatant was removed by filtration and the residue was washed twice with 50 ml of toluene, washed once with 50 ml of hexane and then dried under reduced pressure to obtain a fluid solid.

Amounts of zirconium and aluminum in 1 g of the resulting fluid solid were 9.87µmol and 2.40 mmol, respectively.

(3) Polymerization

The interior of an autoclave (internal volume: 400 ml) equipped with a stirrer was evacuated and 85 g of butane and 15 g of butene-1 were introduced, followed by heating to 70° C. After heating, ethylene was added so that it's partial pressure became 6 kg/cm. After the interior of the system became stable, 1 ml of a heptane solution of triisobutylaluminum (1 mmol/ml) was introduced and then 34.1 mg of the transition metal-containing solid catalyst component prepared in the term (2) was introduced. The polymerization was conducted at 70° C., while ethylene was fed to maintain the total pressure at constant. One hour after the beginning of the polymerization, the polymerization was terminated by introducing 3 ml of ethanol. As a result, 4.55 g of an olefin polymer was obtained and adhesion of the polymer onto the inner wall of the autoclave was not recognized. The polymerization activity per transition metal was $1.3 \times 10^7$ (g/mol/hour).

The resulting olefin polymer had SCB of 22.4 and MFR of less than 0.05.

Example 7

(1) Preparation of Organic Carrier

An acrylonitrile-divinylbenzenecopolymer (60 g) (micro pore volume of 0.62 ml/g for micro pore having their radius of 100–5,000 A:, micro pore volume of 0.71 ml/g for micro pore having their radius of 35–5,000 A:, average particle diameter: 50 µm) was collected in a 2-liter cylindrical flask equipped with a stirrer, a reflux condenser and a thermometer, and 206 g of diethylenetriamine and 36 g of distilled water were added. The reaction was carried out at 130–140° C. for 4 hours. The supernatant was removed by filtration and the residue was washed twice with 1 liter of distilled water. Then, the residue was dried under reduced pressure to obtain 158 g of a fluid solid.

(2) Preparation of Methylaminoxane-treated Organic Carrier

After the atmosphere in a 200 ml flask equipped with a stirrer, a dropping funnel and a thermometer was replaced with nitrogen, 8.05 g of the organic carrier prepared in the term (1) was collected therein. Toluene (100 ml) was added to form a slurry and, after cooled to 4° C., 20.4 ml of a toluene solution of methylaluminoxane (1.97 mmol/g, manufactured by Toso-Akzo Co.) was added dropwise. As a result, gas was generated. After stirring at 4° C. for 30 minutes, then at 25° C. for 2 hours, the supernatant was removed by filtration. The residue was washed three times with 100 ml of toluene and then dried under reduced pressure to obtain a fluid solid.

(3) Preparation of Aluminum Compound-containing Solid Catalyst Component

After the atmosphere in a 200 ml flask equipped with a stirrer and a dropping funnel was replaced with nitrogen, 5.46 g of the methylaluminoxane-treated silica prepared in (2) above was collected therein. Toluene (80 ml) was added to form a slurry and 30 ml of a toluene solution of pentafluorophenol (3.20 g) was added dropwise. After stirring at room temperature for 3 hours, the supernatant was removed by filtration. The residue was washed three times with 50 ml of toluene, washed once with 50 ml of hexane and then dried under reduced pressure to obtain 6.1 g of a fluid solid.

(4) Preparation of Transition Metal-containing Solid Catalyst Component

After the atmosphere in a 50 ml flask equipped with a stirrer was replaced with nitrogen, 2.09 g of the aluminum compound-containing solid catalyst component prepared in the term (3) was collected therein. Toluene (40 ml) was added to form a slurry and 2.85 ml of a toluene solution of dicyclopentadienylzirconium dichloride (4 μmol/ml) was added, followed by stirring at room temperature for 1 hour. The supernatant was removed by filtration and the residue was washed twice with 50 ml of toluene, washed once with 50 ml of hexane and then dried under reduced pressure to obtain a fluid solid. Amounts of zirconium and aluminum in 1 g of the resulting fluid solid were 2.19 μmol and 2.67 mmol, respectively.

(5) Polymerization

The interior of an autoclave (internal volume: 400 ml) equipped with a stirrer was evacuated and 85 g of butane and 15 g of butene-1 were introduced, followed by heating to 70° C. After heating, ethylene was added so that it's partial pressure became 6 kg/cm$^2$. After the interior of the system became stable, 1.0 ml of a heptane solution of triisobutylaluminum (1 mmol/ml) was introduced and then 27.8 mg of the transition metal-containing solid catalyst component prepared in (4) above was introduced. The polymerization was conducted at 70° C., while ethylene was fed to maintain the total pressure at constant. One hour after the beginning of the polymerization, the polymerization was terminated by introducing 3 ml of ethanol. As a result, 2.08 g of an olefin polymer was obtained and adhesion of the polymer onto the inner wall of the autoclave was not recognized. The polymerization activity per transition metal was 3.4'10$^7$ (g/mol/hour).

The resulting olefin polymer had SCB of 23.9.

Example 8

(1) Preparation of Isobutylaluminoxane-treated Silica

After the atmosphere in a 300 ml flask equipped with a stirrer, a dropping funnel and a thermometer was replaced with nitrogen, 8.42 g of a silica (ES70X, manufactured by Crossfield Co.) calcined under a nitrogen flow at 300° C. for 5 hours was collected therein. Toluene (100 ml) was added to form a slurry and, after cooled to 4° C., 43.0 ml of a toluene solution of methylaluminoxane (1.37 mmol/g, manufactured by Toso-Akzo Co.) was added dropwise. After stirring at 4° C. for 30 minutes, then at 8020° C. for 5 hours, the supernatant was removed by filtration. The residue was washed four times with 100 ml of toluene, washed once with 100 ml of hexane and then dried under reduced pressure to obtain 10.5 g of a fluid solid.

(2) Preparation of Aluminum Compound-containing Solid Catalyst Component

After the atmosphere in a 300 ml flask equipped with a stirrer and a dropping funnel was replaced with nitrogen, 10.4 g of the isobutylaluminoxane-treated silica prepared in (1) above was collected therein. Toluene, (100 ml) was added to form a slurry and 40 ml of a toluene solution of pentafluorophenol (3.75 g) was added dropwise. After stirring at 30° C. for 3 hours, then at 80° C. for 2.5 hours, the supernatant was removed by filtration. The residue was washed four times with 100 ml of toluene, washed once with 100 ml of hexane and then dried under reduced pressure to obtain 12.1 g of a fluid solid.

(3) Preparation of Transition Metal-containing Solid Catalyst Component

After the atmosphere in a 500 ml flask equipped with a stirrer was replaced with nitrogen, 2.13 g of the aluminum compound-containing solid catalyst component prepared in (2) above was collected therein. Toluene (35 ml) was added to form a slurry and 9.0 ml of a toluene solution of dicyclopentadienylzirconium dichloride (4 μmol/ml) was added, followed by stirring at room temperature for 1 hour. The supernatant was removed by filtration, and the residue was washed twice with 50 ml of toluene, washed once with 50 ml of hexane and then dried under reduced pressure to obtain a fluid solid.

Amounts of zirconium and aluminum in 1 g of the resulting fluid solid were 14.3 μmol and 1.32 mmol, respectively.

(4) Polymerization

The interior of an autoclave (internal volume: 400 ml) equipped with a stirrer was evacuated and 90 g of butane and 10 g of butene-1 were charged, followed by heating to 70° C. After heating, ethylene was added so that it's partial pressure became 6 kg/cm$^2$. After the interior of the system became stable, 1 ml of a heptane solution of triisobutylaluminum (1 mmol/ml) was introduced and then 14.5 mg of the transition metal-containing solid catalyst component prepared in (3) above was introduced. The polymerization was carried out at 70° C., while ethylene was fed to maintain the total pressure at constant. One hour after the beginning of the polymerization, the polymerization was terminated by introducing 3 ml of ethanol. As a result, 6.99 g of an olefin polymer was obtained and adhesion of the polymer onto the inner wall of the autoclave was not recognized. The polymerization activity per transition metal was 3.4×10$^7$ (g/mol/hour).

The resulting polymer had SCB of 20.2

Example 9

(1) Preparation of Transition Metal-containing Solid Catalyst Component

After the atmosphere in a 100 ml flask equipped with a stirrer was replaced with nitrogen, 1.96 g of the aluminum compound-containing solid catalyst component prepared in Example 1 (2) was collected therein. Toluene (40 ml) was added to form a slurry and 5.97 ml of a toluene solution of dicyclopentadienylzirconium dichloride (4 μmol/ml) was added, followed by stirring at room temperature for 1 hour. The supernatant was removed by filtration and the residue was washed twice with 50 ml of toluene, washed once with 50 ml of hexane and then dried under reduced pressure to obtain a fluid solid.

Amounts of zirconium and aluminum in 1 g of the resulting fluid solid were 12.0 μmol and 2.44 mmol, respectively.

(2) Polymerization

The interior of an autoclave (internal volume: 400 ml) equipped with a stirrer was evacuated and 85 g of butane and 15 g of butene-1 were introduced, followed by heating to 70° C. After heating, ethylene was added so that it's partial pressure became 6 kg/cm$^2$. After the interior of the system became stable, 1 ml of a heptane solution of triethylaluminum (1 mmol/ml) was introduced and then 22.2 mg of the transition metal-containing solid catalyst component prepared in (1) above was introduced. The polymerization was conducted at 70° C., while ethylene was fed to maintain the total pressure at constant. One hour after the beginning of the polymerization, the polymerization was terminated by introducing 3 ml of ethanol. As a result, 6.73 g of an olefin polymer was obtained. The polymerization activity per transition metal was 2.5×10$^7$ (g/mol/hour).

The resulting olefin polymer had SCB of 23.6 and MFR of 3.34.

Comparative Example 1

(1) Supporting of Metallocene Complex with Methylaluminoxane-treated Silica

After the atmosphere in a 100 ml flask equipped with a stirrer was replaced with nitrogen, 1.00 g of the methylaluminoxane-treated silica prepared in Example 1 (1) was collected therein. Toluene (35 ml) was added to form a slurry and 3.41 ml of a toluene solution of dicyclopentadienylzirconium dichloride (4 μmol/ml) was added, followed by stirring at room temperature for 1 hour. The supernatant was removed by filtration and the residue was washed twice with 50 ml of toluene, washed once with 50 ml of hexane and then dried under reduced pressure to obtain a fluid solid.

Amounts of zirconium and aluminum in 1 g of the resulting fluid solid was 12.1 μmol and 2.34 mmol, respectively.

(2) Polymerization

The interior of an autoclave (internal volume: 400 ml) equipped with a stirrer was evacuated and 85 g of butane and 15 g of butene-1 were introduced, followed by heating to 70° C. After heating, ethylene was added so that it's partial pressure became 6 kg/cm$^2$. After the interior of the system became stable, 1 ml of a heptane solution of triisobutylaluminum (1 mmol/ml) was introduced and then 65.9 mg of the solid component prepared in the term (1) was introduced. The polymerization was conducted at 70° C., while ethylene was fed to maintain the total pressure at constant. One hour after the beginning of the polymerization, the polymerization was terminated by introducing 3 ml of ethanol. As a result, 3.64 g of an olefin polymer was obtained and adhesion of the polymer onto the inner wall of the autoclave was not recognized. The polymerization activity per transition metal was 4.6×10$^6$ (g/mol/hour) and was very low in comparison with the case where a treatment was conducted using an electron attractive group.

The resulting olefin polymer had SCB of 23.1 and MFR of 0.746.

Comparative Example 2

(1) Supporting of Metallocene Complex with Methylaluminoxane-treated Silica

After the atmosphere in a 100 ml flask equipped with a stirrer was replaced with nitrogen, 0.96 g of the methylaluminoxane-treated silica prepared in Example 1 (1) was collected therein. Toluene (35 ml) was added to form a slurry and 3.24 ml of a toluene solution of dimethylsilylene (tetramethylcyclopentadienyl)(t-butylammonium)titanium dichloride (4 μmol/ml) was added, followed by stirring at room temperature for 1 hour. The supernatant was removed by filtration and the residue was washed twice with 50 ml of toluene, washed once with 50 ml of hexane and then dried under reduced pressure to obtain a fluid solid.

Amounts of zirconium and aluminum in 1 g of the resulting fluid solid were 16.6 μmol and 2.34 mmol, respectively.

(2) Polymerization

The interior of an autoclave (internal volume: 400 ml) equipped with a stirrer was evacuated and 100 g of butane was introduced, followed by heating to 70° C. After heating, ethylene was added so that it's partial pressure became 6 kg/cm$^2$. After the interior of the system became stable, 1 ml of a heptane solution of triisobutylaluminum (1 mmol/ml) was introduced and then 36.4 mg of the solid component prepared in (1) above was introduced. The polymerization was conducted at 70° C., while ethylene was fed to maintain the total pressure at constant. One hour after the beginning of the polymerization, the polymerization was terminated by introducing 3 ml of ethanol. As a result, 0.62 g of an olefin polymer was obtained and adhesion of the polymer onto the inner wall of the autoclave was not recognized. The polymerization activity per transition metal was 1.1×10$^6$ (g/mol/hour) and was very low in comparison with the case where a treatment was conducted using a compound having an electron attractive group.

Comparative Example 3

(1) Modification of Methylaluminoxane

According to the method described in Example 1 of JP-A-06329714, an aluminumoxy compound was prepared. That is, after the atmosphere in a 200 ml flask equipped with a stirrer, a dropping funnel and a thermometer was replaced with nitrogen, 3.89 g of methylaluminoxane was collected therein and dissolved in 67 ml of toluene. After cooled to 5° C., a solution prepared by dissolving 12.3 g of pentafluorophenol in 50 ml of toluene was added dropwise, followed by stirring at room temperature for 18 hours. After drying under reduced pressure, toluene was added to form 0.91 mmol/ml of a toluene slurry.

(2) Preparation of Modified Methylaluminoxane-treated Silica

After the atmosphere in a 200 ml flask equipped with a stirrer, a dropping funnel and a thermometer was replaced with nitrogen, 4.86 g of a silica (ES70X, manufactured by Crossfield Co.) calcined under a nitrogen flow at 300° C. for 5 hours was collected therein. Toluene (100 ml) was added to form a slurry and, after cooled to 4° C., 36.0 ml of the toluene slurry of modified methylaluminoxane (0.91 mmol/ml) prepared in (1) above was added dropwise. After stirring at 4° C. for 30 minutes, then at 80° C. for 5 hours, the supernatant was removed by filtration. The residue was washed twice with 50 ml of toluene, washed once with 50 ml of hexane and then dried under reduced pressure to obtain 11.4 g of a fluid solid.

(3) Supporting of Metallocene

After the atmosphere in a 50 ml flask equipped with a stirrer was replaced with nitrogen, 2.10 g of the modified methylaluminoxane-treated silica prepared in the term (2) was collected therein. Toluene (50 ml) was added to form a slurry and 6.1 ml of a toluene solution of dicyclopentadienylzirconium dichloride (4 μmol/ml) was added, followed by stirring at room temperature for 1 hour. The supernatant was removed by filtration and the residue was washed twice with 50 ml of toluene, washed once with 50 ml of hexane and then dried under reduced pressure to obtain a fluid solid. The resulting fluid solid contained an irregular micro solid, in addition to a carrier.

Amounts of zirconium and aluminum in 1 g of the resulting fluid solid were 12.1 μg mol and 1.94 mmol, respectively.

(4) Polymerization

The interior of an autoclave (internal volume: 400 ml) equipped with a stirrer was evacuated and 90 g of butane and 10 g of butene-1 were introduced, followed by heating to 70° C. After heating, ethylene was added so that it's partial pressure became 6 kg/cm$^2$. After the interior of the system became stable, 1 ml of a heptane solution of triisobutylaluminum (1 mmol/ml) was introduced and then 15.1 mg of the solid component prepared in (3) above was introduced. The polymerization was conducted at 70° C., while ethylene was fed to maintain the total pressure at constant. One hour after the beginning of the polymerization, the,polymerization was terminated by introducing 3 ml of ethanol. As a result, 2.22 g of an unfixed-form olefin polymer was obtained. The polymerization activity per transition metal was 1.2×10$^7$ (g/mol/hour) and was lower than that of Example 1.

The resulting olefin polymer had SCB of 23.5, MFR of 0.0372 and BD of 0.11 (g/ml). The bulk density was lower than that of Example 1 and particle properties were not good.

According to the present invention, there are provided a catalyst for olefin polymerization, which gives an olefin polymer having excellent particle properties in high polymerization activity when various metallocene complexes are applied to slurry polymerization or vapor phase polymerization, and a method for producing an olefin polymer using the catalyst.

What is claimed is:

1. A method for producing an olefin polymer, which comprises polymerizing an olefin with a catalyst for olefin polymerization prepared by a process comprising contacting:

an aluminum compound-containing solid catalyst component obtained by a process which comprises bringing a carrier into contact with an organoaluminumoxy compound, followed by bringing into contact with a compound having an electron attractive group; with a transition metal compound; and an organoaluminum compound.

2. The method according to claim 1, wherein the compound having an electron attractive group also has a polar functional group.

3. The method according to claim 1, wherein the compound having an electron attractive group is a halogenated phenol.

4. A method for producing an olefin polymer, which comprises polymerizing an olefin with a catalyst for olefin polymerization prepared by a process comprising contacting:

a transition metal-containing solid catalyst component obtained by bringing an aluminum compound-containing solid catalyst component obtained by a process comprising bringing a carrier into contact with an organoaluminumoxy compound, followed by bringing into contact with a compound having an electron attractive group, into contact with a transition metal compound; and an organoaluminum compound.

5. The method according to claim 4, wherein the compound having an electron attractive group also has a polar functional group.

6. The method according to claim 4, wherein the compound having an electron attractive group is a halogenated phenol.

7. The method according to claim 1, wherein the olefin polymer is an ethylene/α-olefin copolymer.

8. The method according to claim 2, wherein the olefin polymer is an ethylene/α-olefin copolymer.

9. The method according to claim 3, wherein the olefin polymer is an ethylene/α-olefin copolymer.

10. The method according to claim 4, wherein the olefin polymer is an ethylene/α-olefin copolymer.

11. The method according to claim 5, wherein the olefin polymer is an ethylene/α-olefin copolymer.

12. The method according to claim 6, wherein the olefin polymer is an ethylene/α-olefin copolymer.

13. The method according to claim 1, wherein the carrier has a micropore volume of not less than 0.1 ml/g and an average particle diameter of from 5 to 1000 μm.

14. The method according to claim 4, wherein the carrier has a micropore volume of not less than 0.1 ml/g and an average particle diameter of from 5 to 1000 μm.

15. The method according to claim 1, wherein the compound having an electron attractive group has a polar functional group capable of forming a chemical bond to an organoaluminum compound.

16. The method according to claim 4, wherein the compound having an electron attractive group has a polar functional group capable of forming a chemical bond to an organoaluminum compound.

17. The method according to claim 1, wherein the compound having an electron attractive group is selected from the group consisting of pentafluorophenol, 2,3,5,6-tetrafluorophenol, 2,4,6-trifluorophenol, 2,3-difluorophenol, 2,4-difluorophenol, 2,5-difluorophenol, 2,6-difluorophenol, 3,4-difluorophenol, 3,5-difluorophenol, 2-fluorophenol, 3-fluorophenol, 4-fluorophenol, 2-trifluoromethylphenol, 3-trifluoromethylphenol, 4-trifluoromethylphenol, pentafluorobenzamide, pentafluoroaniline, pentafluorobenzoic acid, pentafluorobenzyl alcohol, pentafluorothiophenol, 2,2,2-trifluoroethyl alcohol, 1H, 1H-pentafluoro-propanol, 1,1,1,3,3,3-hexafluoro-1-propyl alcohol, trifluoroacetic acid, trifluoromethanesulfonic acid, pentachlorophenol, pentabromophenol, 2-chloro-4-fluorophenol, 2-bromo-4-fluorophenol, 2-bromo-4,5-difluorophenol, tetrafluorocatechol, and tetrafluorohydroquinone.

18. The method according to claim 4, wherein the compound having an electron attractive group is selected from the group consisting of pentafluorophenol, 2,3,5,6-tetrafluorophenol, 2,4,6-trifluorophenol, 2,3-difluorophenol, 2,4-difluorophenol, 2,5-difluorophenol, 2,6-difluorophenol, 3,4-difluorophenol, 3,5-difluorophenol, 2-fluorophenol, 3-fluorophenol, 4-fluorophenol, 2-trifluoromethylphenol, 3-trifluoromethylphenol, 4-trifluoromethylphenol, pentafluorobenzamide, pentafluoroaniline, pentafluorobenzoic acid, pentafluorobenzyl alcohol, pentafluorothiophenol, 2,2,2-trifluoroethyl alcohol, 1H, 1H-pentafluoro-propanol, 1,1,1,3,3,3-hexafluoro-2-propyl alcohol, trifluoroacetic acid, trifluoromethanesulfonic acid, pentachlorophenol, pentabromophenol, 2-chloro-4-fluorophenol, 2-bromo-4-fluorophenol, 2-bromo-4,5-difluorophenol, tetrafluorocatechol, and tetrafluorohydroquinone.

* * * * *